United States Patent
Ludwig

[15] 3,666,865
[45] May 30, 1972

[54] STABILIZED TRANS-DIETHYLSTILBESTROL FORMULATIONS

[72] Inventor: Nelson H. Ludwig, Greenfield, Ind.
[73] Assignee: Eli Lilly and Compnay, Indianapolis, Ind.
[22] Filed: May 13, 1970
[21] Appl. No.: 37,003

Related U.S. Application Data

[63] Continuation-in-part of Ser. No. 852,908, Aug. 25, 1969, abandoned.

[52] U.S. Cl. ..........424/346, 260/619 B
[51] Int. Cl. ..........A61k 27/00
[58] Field of Search..........424/346; 260/619 B

[56] References Cited

UNITED STATES PATENTS 3,042,525   7/1962   Mattox ..........424/346

*Primary Examiner*—Sam Rosen
*Attorney*—Everet F. Smith and Walter E. Buting

[57] ABSTRACT

The isomerization of trans-diethylstilbestrol to the inactive cis isomer in animal feed compositions is substantially inhibited by the addition of the combination of a phenolic antioxidant compound and a nitrogen compound or a base or basic salt.

8 Claims, No Drawings

STABILIZED TRANS-DIETHYLSTILBESTROL FORMULATIONS

CROSS-REFERENCE TO RELATED APPLICATIONS

This application is a continuation-in-part application, of U.S. Ser. No. 852,908 filed Aug. 25, 1969, now abandoned.

BACKGROUND OF THE INVENTION

The well known estrogen diethylstilbestrol (DES), $\alpha,\alpha'$-diethyl-4,4'-stilbenediol, has achieved considerable commercial importance as a feed additive for fattening ruminants, particularly cattle. (U.S. Pat. No. 2,751,303) The estrogen is commonly formulated as a liquid or dry premix composition and incorporated as such into the animal feedstuff or feed supplement.

The trans isomer of diethylstilbestrol, represented by the following structural formula, is the biologically active isomeric form.

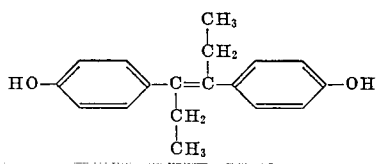

cis-Diethylstilbestrol of the formula

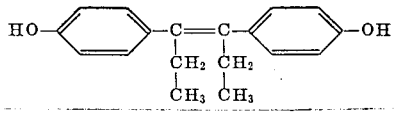

is reported by Dodds to have only one-twentieth of the estrogenic activity of the trans isomer. C. Dodds, Biochemical Contribution to Endocrinology, Experiments in Hormonal Research. p 34. Stanford Univ. Press, Stanford, Calif. 1957. It has also been found that the cis isomer is essentially inactive in growth promotion and nitrogen retention studies carried out in lambs. The cis isomer is also reported to be the less stable isomer, tending to isomerize readily into the more stable trans-diethylstilbestrol. The Merck Index, Seventh Ed., P. 354 (1960). It has been generally accepted until now that diethylstilbestrol, as contained in various agricultural formulations, exists solely in the active trans form.

Investigation prompted by observed variations in biological assay levels of diethylstilbestrol-containing agricultural formulations has revealed the heretofore unrecognized presence of the inactive cis-diethylstilbestrol in such formulations. Levels of cis-diethylstilbestrol ranging from about 10 percent to about 30 percent of total diethylstilbestrol content have been found in such formulations. A concurrent decrease in the amount of trans-diethylstilbestrol is observed.

Stability studies undertaken to explain the decrease in trans-diethylstilbestrol content in liquid and dry formulations have indicated that the active trans isomer is converted to the inactive cis isomer. Stabilized trans-diethylstilbestrol formulations, therefore, would constitute an important contribution in animal husbandry.

SUMMARY

This invention relates to diethylstilbestrol formulations. In particular, this invention relates to novel diethylstilbestrol (DES) formulations in which the stability of trans-diethylstilbestrol contained therein is substantially enhanced.

In accordance with the practice of this invention, it has now been found that the isomerization of trans - DES in liquid and solid animal feed compositions is substantially inhibited by adding thereto an effective amount of a combination of a phenolic antioxidant compound and a nitrogen compound or base or basic salt the phenolic antioxidant compound being selected from the group consisting of 1-naphthol, 2-naphthol and a compound represented by the formula

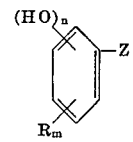

wherein $n$ and $m$ are integers from 1 to 3, R is hydrogen, $C_1$–$C_{12}$ alkyl, $C_1$–$C_4$ lower alkoxy, $C_1$–$C_4$ alkylthio, $C_2$–$C_5$ alkanoyl, $C_2$–$C_5$ carbalkoxy, formyl, carboxy, carboxamido, halogen, amino, $C_1$–$C_4$ monoalkylamino and Z is hydrogen or a group of the formula

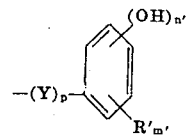

wherein $m'$, $n'$ are integers from 1 to 3 and R' has the same meanings as previously assigned for R, $p$ is 0 or 1 and when $p$ is 1, Y is

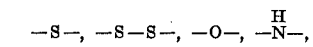

or a $C_1$–$C_4$ alkylene group, and when R and R' is other than amino, $C_1$–$C_4$ monoalkylamino or formyl the sum of $n$ and $n'$ is at least 2; the nitrogen compound being selected from the group consisting of urea, ammonium hydroxide and an amine of the formula

wherein $R_1$, $R_2$ and $R_3$ can be the same or different and are hydrogen, $C_1$–$C_{12}$ alkyl, $C_2$–$C_4$ hydroxyalkyl or $C_2$–$C_6$ aminoalkyl, and the base or basic salt being selected from the group consisting of the alkali metal bicarbonates, carbonates, borates, silicates and phosphates, the alkali and alkaline earth metal $C_2$–$C_4$ alkyl mono- and polycarboxylates and the alkali and alkaline earth metal hydroxides.

DETAILED DESCRIPTION

According to the present invention the isomerization of the biologically active trans isomer of diethylstilbestrol to the biologically inactive cis isomer in livestock feed compositions is inhibited by incorporating in such compositions a phenolic antioxidant of the formula

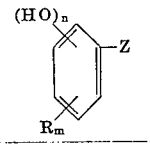

wherein R, Z, $m$ and $n$ have the same meanings as previously designated, in combination with a nitrogen containing compound selected from the group consisting of urea, ammonium hydroxide and an amine of the formula

wherein $R_1$, $R_2$ and $R_3$ have the same meaning as previously assigned or a base or basic salt selected from the group consisting of the alkali metal and alkaline earth metal hydroxides, bicarbonates, carbonates, borates, phosphates, and $C_2$–$C_5$ alkylcarboxylates.

The term "phenolic antioxidant" as employed herein includes the monohydroxynaphthalenes such as 1-naphthol and 2-naphthol, the monocyclic phenols of the formula

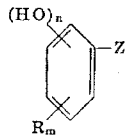

wherein Z is hydrogen and R, n and m have the same meanings as previously defined, the 2,2'- and 4,4'-alkylene bis mono and polyhydric phenols, the hydroxylated biphenyls, the hydroxylated diphenyl ethers, hydroxylated diphenyl sulfides, the hydroxylated diphenyl disulfides and the hydroxylated diphenylamines, all optionally substituted with a group or groups as defined by $R_m$ in the above general formula.

The term "$C_1$–$C_{12}$ alkyl" refers to both straight and branched chain alkyl substituents such as methyl, ethyl, n-propyl, iso-propyl, n-butyl, sec-butyl, iso-butyl, tert-butyl, n-hexyl, n-heptyl, n-octyl, iso-octyl, n-decyl, n-dodecyl, undecyl and the like. "$C_1$–$C_4$ lower alkoxy" refers to methoxy, ethoxy, n-propoxy, iso-propoxy, n-butoxy and the like. "$C_1$–$C_4$ alkylthio" refers to lower alkylthio groups such as methylthio, ethylthio, isopropylthio, n-butylthio and the like. "$C_1$–$C_5$ alkanoyl" refers to acetyl n-propionyl, n-butyryl, iso-butyryl and the like. "$C_1$–$C_5$ carbalkoxy" refers to both the straight and branched chain $C_1$–$C_4$ alkyl ester derivatives of the carboxy substituent such as carbomethoxy, carboethoxy, carbopropoxy, carbobutoxy, carbo-t-butoxy and the like. The term "$C_1$–$C_4$ monoalkylamino" refers to the lower alkylamino substituents such as methylamino, ethylamino, n-propylamino, iso-propylamino, n-butylamino, sec-butylamino and the like. Halogen refers to fluoro, chloro, bromo and iodo. The term "$C_{1-4}$ alkylene group" refers to the straight and branched chain divalent hydrocarbon radicals such as —$CH_2$—, —$CH_2$—$CH_2$—, —$CH_2$—$CH_2$—$CH_2$—, $CH_3$—$\underset{|}{C}$—$CH_3$, —$CH_2CH_2CH_2CH_2$—, $CH_2$—$\underset{\underset{CH_3}{|}}{CH}$—$CH_2$— and like alkylene groups.

Illustrative of the phenolic and substituted phenolic compounds which can be employed in accordance with the present invention are the naphthols, 1-naphthol and 2-naphthol; polyhydroxybenzenes such as catechol, resorcinol, hydroquinone, pyrogallol, phloroglucinol and 1,2,4-trihydroxybenzene; polyhydroxybenzoic acids such as 3,4-dihydroxybenzoic acid, 2,3-dihydroxybenzoic acid, gentisic acid, the α,β-and γ-resorcylic acids, gallic acid and 2,3,4-trihydroxybenzoic acid; the methyl, ethyl, n-propyl, iso-propyl, n-butyl, sec-butyl and tert-butyl esters of the foregoing polyhydroxybenzoic acids; the amide derivatives of the foregoing polyhydroxybenzoic acids such as 3,4-dihydroxybenzamide, 3,4,5-trihydroxybenzamide and the like; hydroxybenzaldehydes such as protocatechuic aldehyde, p-hydroxybenzaldehyde, 2,4-dihydroxybenzaldehyde, vanillin, o-hydroxybenzaldehyde, 4-n-butoxy-2-hydroxybenzaldehyde, 3-ethoxy-4-hydroxybenzaldehyde and the like; halogenated polyhydroxybenzenes such as 4-chlororesorcinol, 4-bromoresorcinol, 4-chlorocatechol and the like; the alkyl polyhydroxybenzenes such as orcinol, 4-isopropylcatechol, toluhydroquinone, t-butylhydroquinone, 4-n-butylresorcinol, 4-n-hexylresorcinol, 4-n-decylcatechol, n-butylhydroquinone, and the like; the lower alkanoyl polyhydroxybenzenes such as acetoresorcinol, quinacetophenone, 4-acetylcatechol, 2,4,5-trihydroxypropiophenone, 2,4,5-trihydroxybutyrophenone, gallacetophenone, 2,3,4-trihydroxybutyrophenone and the like; the aminophenols such as p-aminophenol, o-aminophenol, 3-methyl-4-aminophenol, 4-methylaminophenol, 4-n-propylaminophenol, 2-n-butylaminophenol, 2-methoxy-4-aminophenol; the hydroxylated biphenyls such as 2,2',4,4'-tetrahydroxybiphenyl, 2,2'-dihydroxybiphenyl, 4,4'-dihydroxybiphenyl, 2,3,4'-trihydroxybiphenyl, 3,3',4,4'-tetrahydroxybiphenyl, and the like; the hydroxylated diphenylethers such as 4,4'-dihydroxydiphenylether, 2,2',4,4'-tetrahydroxydiphenylether, 2,2'-dihydroxy-4,4'-dimethyldiphenylether, 3,4,4'-trihydroxydiphenylether and the like; the hydroxylated diphenylsulfides such as 2,2',4,4'3,3',5,5'-tetra-t-butyl-4,4'-dihydroxydiphenyl sulfide, 2,2'-dihydroxydiphenyl sulfide, 2,2'-dihydroxy- 4,4'-dimethyldiphenyl sulfide and the hydroxylated diphenyl disulfides such as 2,2',4,4'-tetrahydroxydiphenyl disulfide, 2,4-dihydroxy diphenyl disulfide, 2,2',4-trihydroxydiphenyl disulfide and the like; the alkylene bis hydroxylated phenols such as 4,4'-methylene-bis(2,6-di-t-butylphenol), nordihydroguaiaretic acid, 4,4'-butylidene-bis(6-t-butyl-m-cresol), 4,4'-ethylene-bis(resorcinol), 4,4'-isopropylidene-bis(resorcinol), 2,2'-methylene-bis(hydroquinone) and the like, the hydroxylated diphenylamines such as 2,2',4,4'-tetrahydroxydiphenylamine, 2,2'-dihydroxydiphenylamine, 3,3',4,4'-tetrahydroxydiphenylamine, 4,4'-dihydroxydiphenylamine, 2,2'-dimethyl-4,4'-dihydroxydiphenyl amine and the like.

The term "nitrogen compound" includes within its definition as used herein, urea, ammonium hydroxide and amines of the formula

wherein $R_1$, $R_2$, and $R_3$ are the same or different and are hydrogen, $C_1$–$C_{12}$ alkyl, $C_2$–$C_5$ hydroxyalkyl or $C_2$–$C_6$ aminoalkyl.

$C_1$–$C_{12}$ alkyl refers to both straight and branched chain alkyl substituents such as methyl, ethyl, propyl, isopropyl, butyl, sec-butyl, tert-butyl, amyl, sec-amyl, hexyl, octyl, iso-octyl, nonyl, decyl, dodecyl and the like.

$C_2$–$C_4$ hydroxyalkyl refers to hydroxyl substituted alkyl substituents such as hydroxyethyl, 3-hydroxypropyl, 2-hydroxypropyl, 3-hydroxybutyl, 4-hydroxybutyl and the like.

$C_2$–$C_6$ aminoalkyl refers to amino substituted alkyl substituents such as aminoethyl, 3-aminopropyl, 2-aminopropyl, 3-aminopropyl, 4-aminobutyl, 4-aminopentyl, 5-aminopentyl, 6-aminohexyl and the like.

Examples of the nitrogen compounds which may be used in the present invention are urea, ammonia, ammonium hydroxide, the primary amines such as methylamine, ethylamine, propylamine, isopropylamine, n-butylamine, 2-aminobutane, amylamine, sec-amylamine, heptylamine, octylamine, isooctylamine, decylamine, dodecylamine, and the like, the secondary alkyl amines such as dimethylamine, diethylamine, methylethylamine, diisopropylamine, dibutylamine, dioctylamine, ethylbutylamine, diheptylamine and didodecylamine, dodecylmethylamine and the like, and the tertiary alkylamines such as triethylamine, tripropylamine, triamylamine, diethylbutylamine, trihexylamine, tridecylamine, didecylmethylamine, tridodecylamine and the like; the primary, secondary and tertiary hydroxyalkylamines such as 2-aminoethanol, 3-aminopropanol, 4-aminobutanol, 2-aminopropanol, 3-aminobutanol, diethanol amine, triethanol amine, dipropanol amine, dibutanol amine, tripropanol amine, tributanolamine and the like; and the alkyl diamines such as ethylene diamine 1,3-propane diamine; 1,4-butane diamine, 1,3-butane diamine, 1,5-pentane diamine, 1,6-hexane diamine and the like; the hydroxyalkylated primary and secondary alkyl amines such as N-(2-hydroxyethyl)methylamine, N,N-di(2-hydroxyethyl)methylamine, N-(3-hydroxypropyl)ethylamine, N-(4-hydroxybutyl)diethylamine, N,N-di-(2-hydroxyethyl)octylamine, N-(3-hydroxypropyl)dibutylamine, N-(2-hydroxyethyl)didodecylamine, N,N-di(3-hydroxypropyl)heptylamine, N,N-(2-hydroxyethyl)decylamine and the like.

The term, "base or basic salt" refers to the alkali metal or alkaline earth metal hydroxides or salts such as the sodium, potassium, calcium and magnesium salts of weak organic and inorganic acids. Such salts can include the alkali and alkaline earth metal salts of the $C_2$ to $C_5$ alkyl mono and polycarboxylic acids, such as sodium acetate, potassium acetate, calcium acetate, potassium propionate, sodium citrate, sodium oxalate, dipotassium succinate, magnesium butyrate and the like, the alkali metal carbonates, bicarbonates, borates, silicates and phosphates such as sodium bicarbonate, potassium carbonate, sodium borate, sodium silicate, dipotassium phosphate and the like and the alkali metal and alkaline earth metal hydroxides such as sodium hydroxide, potassium hydroxide and calcium hydroxide.

The combination of a phenolic antioxidant compound and a nitrogen compound or an alkali metal or alkaline earth metal base or basic salt inhibits the isomerization of trans-DES when the DES is formulated, as for example, as a liquid premix composition or when it is absorbed on or admixed with a solid carrier, for example, in a dry premix.

The isomerization of trans-DES is effectively inhibited when the phenolic component of the stabilizing combination is employed at inhibitory concentrations from about 2.5 percent to about 100 percent of the weight of DES in formulations in which the nitrogen compound or the base or basic salt is also present at inhibitory concentrations from about 5 percent to about 200 percent of the weight of DES. Concentrations of the phenolic component or of the nitrogen compound, base or basic salt as much as ten times greater than the foregoing can be employed, but are not necessary in order to obtain effective inhibition of isomerization.

Preferred combinations of the present invention include:
2,4,5-trihydroxybutyrophenone and 2-aminobutane
2,4,5-trihydroxybutyrophenone and urea
2,4,5-trihydroxybutyrophenone and ethylenediamine
n-propyl gallate and ethylenediamine,
n-propyl gallate and 2-aminobutane and,
hydroquinone and ethanolamine
2,4,5-trihydroxybutyrophenone and calcium hydroxide and
2,4,5-trihydroxybutyrophenone and sodium carbonate.

An especially preferred combination is 2,4,5-trihydroxybutyrophenone with 2-aminobutane or urea.

The combination of a phenolic antioxidant with a nitrogen compound or base or basic salt as defined herein, and preferably one of the above preferred combinations, functions as a stabilizer for trans-diethylstilbestrol. Since DES finds its most widespread application as a growth promoter in ruminants when incorporated into animal feed compositions, the inhibition of isomerization to the cis form is especially important in such compositions. Animal-feed compositions as employed herein refer to compositions generally employed, directly or indirectly, for feeding livestock and include liquid premix compositions, solid premix compositions, feed supplements, finished feed compositions, and the like.

Liquid premixes are prepared with a wide variety of edible liquid carriers such as ethanol, propylene glycol, soybean oil, corn oil, polyethylene glycol and like liquid carriers. Solid or dry premixes are prepared with a number of edible solid carriers such as alfalfa, soybean meal, rice hulls and the solid carriers referred to by the description in U.S. Pat. No. 3,356,504. Generally, the liquid and solid premixes are blended or mixed with feed stock or feed supplements or enriched nutritional value, to obtain the desired level of diethylstilbestrol.

A preferred trans-DES liquid premix of this invention comprises about 10 percent trans-diethylstilbestrol, about 1 percent 2,4,5-trihydroxybutyrophenone and about 1 percent 2-aminobutane in polyethylene glycol having a molecular weight of from about 200 to 600. Another preferred liquid premix of the present invention comprises about 10 percent trans-diethylstilbestrol, about 1 percent 2,4,5-trihydroxybutyrophenone and about 5 percent urea in polyethylene glycol having a molecular weight of from about 200 to about 600. The percentages recited in the above preferred premixes are expressed on a basis of weight-of-ingredient per volume-of-solvent.

The concentrations of trans-DES and of the components of the phenolic antioxidant-amine or urea combination can vary over a substantial range. For example, a suitable liquid premix in polyethylene glycol can contain from about 0.1 percent to about 15 percent of trans-diethylstilbestrol, from about 0.01 percent to 15 percent of phenolic antioxidant and from about 0.02 percent to about 20 percent of the amine or urea component. Alkali metal or alkaline earth metal bases or basic salts can effectively be employed at concentrations similar to those of the amine or urea. However those skilled in the art will recognize that when the alkali and alkaline earth metal hydroxides are employed in excess amounts, undesirable side reactions may result with other components in trans-DES containing premixes such as alfalfa and feed supplement premixes.

Although the isomerization of trans-DES is inhibited by relatively low concentrations of the stabilizing combinations of this invention, those skilled in the art will recognize that with any desired phenolic antioxidant compound in combination with the desired nitrogen compound or base or basic salt as defined herein, considerable variations in concentrations are possible. For example, amounts of both components in excess of effective inhibitory concentrations can be employed, such amounts being dependent upon physical limitations such as solubility and compatability with the particular DES formulation.

The preferred liquid premixes of this invention are prepared by dissolving the 2,4,5-trihydroxybutyrophenone in polyethylene glycol (M.W. ca 200) and then warming the solution to a temperature of about 50° C. The 2-aminobutane or urea is then added, and, when a clear solution is obtained, the trans-DES is added. The mixture is maintained at about 50° C. until a clear solution is obtained.

A preferred solid premix of this invention comprises about 2 g. of trans-diethylstilbestrol, about 0.2 g. of 2,4,5-trihydroxybutyrophenone and about 0.2 g. of 2-aminobutane per pound of alfalfa granules.

Another preferred solid premix of the present invention comprises about 10 g. of trans-DES, about 1 g. of 2,4,5-trihydroxybutyrophenone and about 5 g. of urea per pound of alfalfa granules.

The preferred method of preparing the solid premixes of this invention comprises first, the preparation of a preferred liquid premix of this invention, as described above, followed by mixing or blending the liquid premix with the edible solid carrier, preferably alfalfa granules. Alternatively, the phenolic antioxidant and the nitrogen compound, base or basic salt can be added to the trans-DES containing animal feed composition in amounts sufficient to obtain the desired concentration which effectively inhibits the isomerization of trans-DES.

The preferred liquid and dry feed premix compositions of this invention are particularly useful for mixing or blending with other feed compositions such as feed supplements and feed stock.

The determination of the cis- and trans-diethylstilbestrol content of the various compositions described herein was accomplished by gas-liquid chromatography (G.L.C.) of the bis-trimethylsilylether derivatives. The sample containing the isomer mixture was allowed to react with bis-trimethylsilylacetamide (BSA) for about 20 minutes, and the bis ether derivative was taken up in chloroform. The chloroform solution was then injected into an F and M – 402 G.L.C. column containing 5 percent XE60 (silicone gum nitrile, supplied by Applied Science Labs., P.O. Box 140, State College, Pa.) and the chromatogram was run at a temperature of about 185° C. The ratio of cis and trans isomers was determined by calculating the area under the respective isomer peaks on the recorded printout. In the case of liquid preparations, three drops of the sample were reacted with one-half ml. of BSA for about 20 minutes. The reaction solution was then diluted with chloroform to a volume of 5 ml., and the diluted solution was injected into the chromatogram. In the case of solid preparations, one gram of the preparation was allowed to react with excess BSA and the bis-trimethylsilylethers of the respective isomers of diethylstilbestrol were extracted with chloroform for injection into the chromatogram.

As previously mentioned, stability studies carried out on DES compositions without added stabilizer indicated the isomerization of the active trans isomer to the inactive cis isomer. Table I shows the percentage of the cis isomer formed with time when a solution of trans-diethylstilbestrol in propylene glycol is maintained at elevated temperatures.

TABLE I

Percent cis-Diethylstilbestrol of Propylene glycol

| Time (min.) | % cis at T° C. | | |
|---|---|---|---|
| | 60 | 80 | 100 |
| 15 | 2 | 15 | 24 |
| 30 | 4 | 19 | 25 |
| 60 | 7 | 23 | 25 |
| 120 | 14 | 24 | 25 |

The data presented in Table I indicate that under the conditions of time and temperature shown, trans-diethylstilbestrol undergoes extensive isomerization to cis-diethylstilbestrol. At a temperature of 100° C., the percentage of cis isomer formed appears to reach a constant value, suggesting that an equilibrium mixture of the cis and trans isomers results.

The following data illustrate the effectiveness of the stabilizing combinations of this invention in inhibiting the isomerization of trans-DES.

Tables II and VI show the percent trans-DES present in liquid polyethylene glycol–200 premixes prepared with 10 percent trans-DES and the indicated stabilizing combination. The premixes were prepared by adding the phenolic antioxidant to 100 ml. of polyethylene glycol–200 and then warming the solvent to a temperature of about 50° C. The nitrogen containing component was then added, and, when a clear solution was obtained, 10 g. of trans-DES was added. When solution was obtained the premix was cooled and aliquots were taken for stability studies at the indicated temperature. The percent trans-DES present at various times was determined by the previously described GLC analytical method.

TABLE II

THBP [1] stabilized trans-diethylstilbestrol premix

| Stabilizing combination | | | Percent trans-D.E.S. at T., ° C. | | | | |
|---|---|---|---|---|---|---|---|
| Percent THBP | Amine or urea | Percent amine or urea | 1 week | 2 weeks | | 4 weeks | |
| | | | 52° C. | 37° C. | 52° C. | 37° C. | 52° C. |
| 2 | ED [2] | 2 | 99 | 99 | 99 | 99 | 99 |
| 2 | Urea | 5 | 97 | 98 | 95 | 97 | 94 |
| 2 | 2AB [3] | 5 | 99 | 99 | 99 | 99 | 99 |
| 1 | NH₄OH [4] | 5 | 99 | 99 | 99 | 99 | 99 |
| 1 | | | 85 | 92 | 78 | 87 | 75 |
| 2 | | | 83 | 95 | 78 | 89 | 77 |

[1] 2,4,5-trihydroxybutyrophenone.
[2] Ethylenediamine.
[3] 2-Aminobutane.
[4] 5 g. of 28% ammonium hydroxide.

TABLE III

THBP [1]—urea and THBP-2-aminobutane stabilized trans-D.E.S. at elevated temperatures

| Stabilizing combination | | | Percent trans-D.E.S. at 75° C. | | | |
|---|---|---|---|---|---|---|
| Percent THBP | Amine or urea | Percent amine or urea | 16 hrs. | 40 hrs. | 80 hrs. | 100 hrs. |
| 2 | Urea | 5 | 97 | | | 92 |
| 2 | do | 5 | 96 | | 91 | |
| 1 | do | 5 | 96 | | 91 | |
| 0.5 | do | 5 | 96 | | 90 | |
| 0.25 | do | 5 | 96 | | 89 | |
| 0.25 | do | 10 | 97 | | 91 | |
| 0.5 | do | 10 | 97 | | 91 | |
| 0.1 | do | 10 | 95 | | 76 | |
| 0.1 | do | 5 | 94 | | 78 | |

Table III—Continued

THBP [1]—urea and THBP-2-aminobutane stabilized trans-D.E.S. at elevated temperatures

| Stabilizing combination | | | Percent trans-D.E.S. at 75° C. | | | |
|---|---|---|---|---|---|---|
| Percent THBP | Amine or urea | Percent amine or urea | 16 hrs. | 40 hrs. | 80 hrs. | 100 hrs. |
| 1 | 2AB [2] | 4 | 99 | 99 | | 98 |
| 1 | 2AB [2] | 2 | 99 | 98 | | 97 |
| 1 | 2AB [2] | 1 | 99 | 98 | | 96 |
| 1 | 2AB [2] | 0.5 | 98 | 97 | | 94.5 |
| 0.5 | 2AB [2] | 2 | 98 | 98 | | 93 |
| 0.5 | 2AB [2] | 1 | 98 | 97 | | 94 |
| 0.5 | 2AB [2] | 0.5 | 98 | 97 | | 93 |
| 0.25 | 2AB [2] | 1 | 97 | 96 | | 91 |
| 0.25 | 2AB [2] | 0.5 | 98 | 94 | | 84 |

[1] 2,4,5-trihydroxybutyrophenone.
[2] 2-aminobutane.

TABLE IV

Propyl gallate stabilized trans-D.E.S. premix

| Stabilizing combination | | | Percent trans-D.E.S. at T.,° C. | | | | |
|---|---|---|---|---|---|---|---|
| Propyl gallate, percent | Amine or urea | Percent amine or urea | 1 week | 2 weeks | | 4 weeks | |
| | | | 52 | 37 | 52 | 25 | 37 | 52 |
| 1 | EA [1] | 2 | 95 | 99 | 93 | | 97 | 92 |
| 1 | EA [1] | 1 | 94 | 99 | 92 | | 97 | 90 |
| 1 | ED [2] | 2 | 97 | 99 | 96 | | 98 | 94 |
| 1 | ED [2] | 1 | 98 | 99 | 97 | | 98 | 95 |
| 2 | NH₄OH [3] | 5 | 92 | 94 | 81 | 96 | 89 | 78 |
| 2 | Urea | 5 | 81 | 87 | 79 | 91 | 83 | 78 |
| 1 | | | 79 | 79 | 78 | | | |
| Control | | | 79 | 79 | 78 | | | |

[1] Ethanolamine.
[2] Ethylenediamine.
[3] 5 g. of 28% ammonium hydroxide.

TABLE V

Hydroquinone (HQ) stabilized trans-D.E.S. premix

| Stabilizing combination | | | Percent trans-D.E.S. at T., ° C. | | | | |
|---|---|---|---|---|---|---|---|
| HQ, percent | Amine or urea | Percent amine or urea | 1 week | 2 weeks | | 4 weeks | |
| | | | 52 | 37 | 52 | 25 | 37 | 52 |
| 1 | EA [4] | 2 | 99 | | 99 | | 99 | 99 |
| 1 | EA [4] | 1 | 99 | | 99 | | 99 | 98 |
| 1 | ED [5] | 2 | 99 | | 99 | | 99 | 98 |
| 1 | ED [5] | 1 | 99 | | 99 | | 99 | 98 |
| 1 | Urea | 5 | 94 | 97 | 91 | 98 | 95 | 88 |
| 1 | NH₄OH | 5 | 97 | 98 | 94 | 99 | 97 | 91 |
| 1 | TEA [1] | 5 | 95 | 98 | 88 | | 96 | 81 |
| 1 | TEM [2] | 5 | 96 | 98 | 93 | | 96 | 89 |
| 1 | IPM [3] | 5 | 99 | 99 | 99 | | 99 | 99 |

Table V—Continued

Hydroquinone (HQ) stabilized trans-D.E.S. premix

| Stabilizing combination | | | Percent trans-D.E.S. at T., ° C. | | | | |
|---|---|---|---|---|---|---|---|
| HQ, percent | Amine or urea | Percent amine or urea | 1 week | 2 weeks | | 4 weeks | |
| | | | 52 | 37 | 52 | 25 | 37 | 52 |
| 1 | | | 84 | 85 | 80 | | 81 | 80 |
| Control | | | 79 | 79 | 78 | | | |

[1] Triethanolamine.
[2] Triethylamine.
[3] Isopropanolamine.
[4] 2-aminoethanol.
[5] Ethylenediamine.

The following Table VI lists additional effective anti-oxidant phenols in combination with ethanolamine.

TABLE VI

One percent ethanolamine—phenolic antioxidant stabilized trans—DES premix

|  | Percent trans—DES at T.°, C. | | | | |
|---|---|---|---|---|---|
|  | 1 week | | 2 weeks | | 4 weeks |
| Antioxidant at 1% | 52 | 37 | 52 | 37 | 52 |
| Resorcinol | 96 | 96 | 96 | 95 | 95 |
| Catechol | 98 | 99 | 98 | 99 | 97 |
| Pyrogallol | 99 | 99 | 99 | 99 | 99 |
| 1-naphthol | 94 | 94 | 94 | 94 | 94 |
| 2-naphthol | 96 | 96 | 96 | 95 | 95 |
| 2,6-dihydroxy-benzoic acid | 89 | 90 | 85 | 85 | 83 |
| 3,4-dihydroxy-benzoic acid | 97 | 99 | 96 | 98 | 94 |

Table VII, which follows, shows the percent trans-DES present in a propylene glycol premix containing 5 percent trans-DES, stabilized with the indicated phenolic antioxidant and amine or ammonium hydroxide stabilizing combination.

The premixes are prepared by adding 0.5 g. each of the indicated phenolic compound and amine or ammonium hydroxide to 50 ml. of propylene glycol. The solution or suspension so obtained is heated to a temperature of about 60°–65° C. and 2.5 g. of trans-DES are added to the warm solutions. The solutions are then maintained at a temperature of about 68° C. for 16 hours during which time the solution is exposed to light and air.

TABLE VII

Stabilized trans-DES—Propylene Glycol Premix One Percent Phenolic Antioxidant — Ethanolamine or Ammonium Hydroxide

| Phenolic Antioxidant at 1 percent conc. | Percent trans-DES at 68° C. (16 hours) | |
|---|---|---|
|  | EA[1] (1%) | NH$_4$OH[2] (1%) |
| p-Aminophenol | 95 | — |
| p-Hydroxybenzaldehyde | 89 | 89 |
| 4,4'-Methylene-bis(2,6-di-t-butylphenol | 98 | — |
| β,γ-Dimethyl-α,δ-bis(3,4-dihydroxyphenyl)butane (nordihydroguaiaretic acid) | 99 | 95 |
| Vanillin | 89 | 96 |
| 2,2'-Dihydroxybiphenyl | 87 | 77 |
| Bis(2,4-dihydroxyphenyl) sulfide | 99 | 87 |
| 2,2',4,4'-Tetrahydroxy biphenyl | 93 | 79 |
| 4,4'-thiodiresorcinol | 99 | 92 |
| Control | 77 | 77 |

[1] Ethanolamine
[2] 28 percent ammonium hydroxide

The data contained in Table VIII, which follows, illustrate the inhibitory effect on the isomerization of trans-DES by the combination of a base or basic salt with 2,4,5-trihydroxybutyrophenone.

The premixes are prepared by adding 0.5 g. each of the indicated alkali or alkaline earth metal base or basic salt and 2,4,5-trihydroxybutyrophenone to 50 ml. of propylene glycol. The solution or suspension thus obtained is heated to a temperature of about 60°–65° C. and 2.5 g. of trans-DES are added to the warm solution or suspension. The solution is maintained at a temperature of about 68° C. for 16 hours.

TABLE VIII

Alkali Metal and Alkaline Earth Metal Basic Salt — THBP[1] Stabilized trans-DES — Propylene Glycol Premix[2]

| Basic Salt 1 percent conc. | Percent trans-DES after 16 hours at 68° C. |
|---|---|
| Sodium acetate | 97 |
| Disodium phosphate* | 97 |
| Sodium bicarbonate* | 99 |
| Sodium carbonate* | 99 |
| Calcium hydroxide* | 99 |
| Calcium carbonate[3] | 92 |
| Sodium borate | 93 |
| THBP control without basic salt | 85 |

[1] 2,4,5-Trihydroxybutyrophenone at a concentration of 1 percent
[2] trans-DES at a concentration of 5 percent
[3] Calcium carbonate in suspension
* Incomplete solution Those skilled in the art will recognize that amines and phenols other than those within the definition of the present invention can function as isomerization inhibitors of trans-diethylstilbestrol when used in combination. Likewise, it will be recognized by those skilled in the art that the combination of a phenolic antioxidant and nitrogen compound, base or basic salt as described herein can function as an inhibitor of trans-DES isomerization in a variety of animal feed compositions other than the preferred compositions of this invention. For example, edible liquid and solid carriers other than those preferred herein will be recognized as compatible with the stabilizing combinations of this invention.

The following examples more fully illustrate the present invention.

EXAMPLE 1

THBP-2-Aminobutane Stabilized trans-DES Liquid Premix

One gram of 2,4,5-trihydroxybutyrophenone was added at a temperature of about 50° C. to 100 ml. of polyethylene glycol having an average molecular weight of 200. One gram of 2-aminobutane was added to the warm solution and after about 20 minutes a clear solution was obtained. Ten grams of trans-diethylstilbestrol were next added and when this was completely dissolved the liquid premix was allowed to cool to room temperature.

Liquid premixes containing lower concentrations of trans-DES are prepared by diluting the 10 percent liquid premix with the required amount of polyethylene glycol.

EXAMPLE 2

THBP-Urea Stabilized trans-DES Liquid Premix

In an analogous manner a stabilized trans-DES liquid premix containing 10 percent trans-DES, 1 percent 2,4,5-trihydroxybutyrophenone and 5 percent urea was prepared when urea was employed.

EXAMPLE 3

Stabilized trans-DES Solid Premix

One hundred ml. of a stabilized liquid premix containing 10 percent of trans-DES in polyethylene glycol, 1 percent 2,4,5-trihydroxybutyrophenone and 1 percent 2-aminobutane prepared as described in Example 1 is added to 1 pound of alfalfa in the form of granules and the mixture thoroughly blended in a mixing chamber. The mixture is dried to obtain a solid dry premix containing about 10 g. of trans-diethylstilbestrol per pound of alfalfa granules.

In an analogous manner a dry premix containing 2 g. of stabilized trans-DES per pound of alfalfa is prepared when a liquid premix containing 2 percent stabilized trans-DES is employed. Likewise a dry alfalfa premix containing 10 g. of stabilized trans-DES per pound of alfalfa, wherein the stabilizing combination is 2,4,5-trihydroxybutyrophenone and urea, is prepared in a similar manner by employing a stabilized liquid premix as described in Example 2.

EXAMPLE 4 trans-DES Finished Feed Composition

One pound of a dry alfalfa premix containing 2 g. of trans-DES; about 0.2 g. of 2,4,5-trihydroxybutyrophenone; and about 0.2 g. of 2-aminobutane per pound of alfalfa carrier is thoroughly mixed with 1 ton of livestock feed in a mixing chamber to obtain an animal feed composition containing approximately 2 g. of trans-diethylstilbestrol per ton of feed.

EXAMPLE 5

THBP-Sodium bicarbonate Stabilized trans-DES Premix

To 50 ml. of polyethylene glycol (PEG–200) was added 0.5 g. of 2,4,5-trihydroxybutyrophenone and 0.5 g. of sodium bicarbonate. The mixture was warmed to a temperature of 50° C. and 5 g. of trans-diethylstilbestrol was added. The mixture was stirred at 50° C. until the trans-diethylstilbestrol was dissolved. The mixture was allowed to cool to room temperature and any undissolved sodium bicarbonate was filtered to obtain a suitable liquid premix. Alternatively the unfiltered mixture was applied to alfalfa granules to obtain a solid premix containing 2 g. of trans-DES per pound of premix.

EXAMPLE 6

THBP-Calcium Hydroxide Stabilized trans-DES Premix

To 50 ml. of polyethylene glycol (PEG–200) was added 0.5 g. of 2,4,5-trihydroxybutyrophenone and 0.5 g. of calcium hydroxide. The mixture was warmed to a temperature of about 50° C., and 5 g. of trans-DES added with stirring. The mixture was stirred at 50° C. until the trans-DES was dissolved. The mixture was cooled to room temperature and undissolved calcium hydroxide filtered to obtain a suitable liquid premix. Alternatively, the unfiltered mixture was applied to alfalfa granules to obtain a solid premix containing 2 g. of trans-DES per pound of premix.

I claim:

1. A stabilized composition of trans-diethylstilbestrol which comprises from 0.1 to 15 percent by weight of trans-diethylstilbestrol; from 0.01 to 15 percent by weight of a phenolic antioxidant compound selected from the group consisting of 1-naphthol, 2-naphthol and a compound of the formula

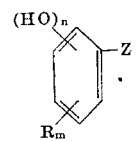

wherein $n$ and $m$ are integers from 1 to 3, R is hydrogen, $C_1$–$C_{12}$ alkyl, $C_1$–$C_4$ lower alkoxy, $C_1$–$C_4$ alkylthio, $C_2$–$C_5$ alkanoyl, $C_2$–$C_5$ carbalkoxy, formyl, carboxy, carboxamido, halogen, amino, $C_1$–$C_4$ monoalkylamino and Z is hydrogen or a substituent of the formula

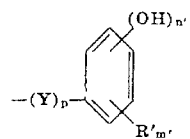

wherein $m'$ and $n'$ are integers from 1 to 3 and R' has the same meanings assigned for R, $p$ is 0 or 1 and when $p$ is 1, Y is or a $C_1$–$C_4$ alkylene group, and when R and R' is other than amino, $C_1$–$C_4$ monoalkylamino or formyl the sum of $n$ and $n'$ is at least 2; from 0.02 to 20 percent by weight of a base or basic salt, or a nitrogen compound selected from the group consisting of urea, ammonium hydroxide and an amine of the formula

wherein $R_1$, $R_2$, and $R_3$ can be the same or different and are hydrogen, $C_1$–$C_{12}$ alkyl, $C_2$–$C_5$ hydroxyalkyl or $C_2$–$C_6$ aminoalkyl; and an edible carrier.

2. The stabilized composition of claim 1 which comprises the phenolic antioxidant compound as defined in claim 1 and a nitrogen compound selected from the group consisting of urea, ammonium hydroxide and an amine of the formula

wherein $R_1$, $R_2$, and $R_3$ can be the same or different and are, hydrogen, $C_1$–$C_{12}$ alkyl, $C_2$–$C_5$ hydroxyalkyl and $C_2$–$C_6$ aminoalkyl.

3. The composition of claim 2 wherein the phenolic antioxidant compound is 2,4,5-trihydroxybutyrophenone.

4. The composition of claim 3 wherein the nitrogen compound is urea.

5. The composition of claim 4 wherein the edible carrier is polyethylene glycol having a molecular weight of from 200 – 600.

6. The composition of claim 4 wherein the edible carrier is alfalfa granules.

7. The composition of claim 1 wherein the phenolic antioxidant compound is 2,4,5-trihydroxybutyrophenone and the basic salt is sodium carbonate.

8. The composition of claim 1 wherein the phenolic antioxidant compound is 2,4,5-trihydroxybutyrophenone and the nitrogen containing compound is 2-aminobutane.

* * * * *